United States Patent [19]

Regan

[11] Patent Number: 4,815,899

[45] Date of Patent: Mar. 28, 1989

[54] TOOL HOLDER AND GUN DRILL OR REAMER

[75] Inventor: Donald J. Regan, Farmington Hills, Mich.

[73] Assignee: NO-MA Enbgineering Incorporated, Farmington Hills, Mich.

[21] Appl. No.: 130,773

[22] Filed: Dec. 9, 1987

Related U.S. Application Data

[63] Continuation-in-part of Ser. No. 91,476, Aug. 31, 1987, and Ser. No. 936,052, Nov. 28, 1986, Pat. No. 4,722,645.

[51] Int. Cl.[4] .............................................. B23B 41/02
[52] U.S. Cl. ....................................... 408/141; 279/52; 408/57; 408/239 R; 408/705; 409/232; 409/234
[58] Field of Search ................... 279/52; 408/141, 238, 408/239 R, 239 A, 240, 57, 59, 199, 705; 409/231, 232, 234

[56] References Cited

U.S. PATENT DOCUMENTS 4,642,005  2/1987  Kondo et al. .................. 409/234 X Primary Examiner—Gil Weidenfeld
Assistant Examiner—Steven C. Bishop
Attorney, Agent, or Firm—Neal A. Waldrop; Jay C. Taylor

[57] ABSTRACT

A tool holder for a gun drill or reamer has internal and external cylindrical rear end pilot portions and a radial pilot flange for precisely connecting coaxially with a rotatable and axially moveable power source. A sleeve confined coaxially within the internal cylindrical portion has an axially extending flat spline surface for effecting driving engagement with a mating flat of a tool shank. A contractible conical split collet at the forward end of the holder coaxially clamps the tool shank when moved axially to a clamping position by means of a non-rotatable nut secured to the collet for cocking out of axial alignment therewith to assure precise coaxial clamping of the tool shaft. The nut is in screw threaded engagement with a rotatable and non-axially moveable collar provided with beveled gear teeth for rotation by a Jacobs type tool.

20 Claims, 1 Drawing Sheet

TOOL HOLDER AND GUN DRILL OR REAMER

This application is a continuation in part of my co-pending application Ser. No. 936,052, filed Nov. 28, 1986, now U.S. Pat. No. 4,722,645, and Ser. No. 091,476, filed Aug. 31, 1987 and discloses a compact, high precision quick change tool holder for a gun drill or reamer.

BACKGROUND AND OBJECTS OF THE INVENTION

Gun drills or reamers of the type with which the present invention is concerned comprise a cutting tool for drilling, reaming, and other machining operations that require a comparatively long tool shaft or shank having a cutting end located at an appreciable axial distance forwardly from its bushing support and its rearward or driven end, which latter is secured to power means for simultaneously rotating and reciprocating the tool during a cutting operation.

The cutting end of the tool may reciprocate axially across a work piece during a cutting operation, or might necessarily be located at some distance axially from its bushing support, and is thus unsupported at least throughout the comparatively long axial extent required for the reciprocating movement. Because of the long unsupported axial extent of the cutting tool, such tools are referred to as gun drills or reamers, although their use is not limited to machining gun barrels. In fact they are commonly used in many industrial machining applications requiring a cutting tool having the above mentioned characteristics.

Customarily, gun drills or reamers are powered by coaxial inner and outer power driven spindles keyed together for rotation as a unit, wherein the inner spindle is also movable axially while rotating to effect the desired cutting operation. Also the inner spindle coaxially supports the rearward portion of the tool shank during the desired rotational and axial cutting movement. The outer spindle is customarily secured to a coaxial bushing adapter that extends forwardly of the inner spindle and around the shank of the cutting tool for an axial distance at least equal to the reciprocating movement and supports a conventional bushing at its forward end for supporting a rotatable and reciprocating tool shank.

Important objects of the present invention are to provide an improved compact quick change tool holder for coaxially supporting the shank of the gun drill or reamer within high precision tolerances for high speed operations that may exceed 8000 rpm; and to provide such a holder having improved radial flange mounting and coaxial pilot means cooperable with the customary inner power driven spindle for attachment therewith in high precision piloted relationship; and which also co-axially supports the rearward portion of the tool shank in spline driving engagement.

Other objects are to provide such a tool holder having improved means for actuating a radially contractable tool clamping split collet for readily and quickly releasably clamping and supporting the tool shank in high precision coaxial alignment forwardly of the coaxial spline driving attachment, and wherein by virtue of the spline driving engagement, the collet is merely required to provide high precision coaxial support for the tool shank without providing driving torque.

Heretofore it has been conventional to utilize a conical split collet movably axially into mating engagement with a conical collet seat for constricting the collet radially around the tool shank, wherein the collet supports the tool shank coaxially and also provides the driving force for rotating the shank during a cutting operation, whereby in consequence of high speed and high torque operation, the collet often spins on the tool shaft, rapidly wearing and requiring replacement of both the collet and shaft.

Another object is to provide simple and effective means for moving the tool clamping collet axially to and from clamping engagement with a tool shank, comprising a non-axially movable collar rotatable on a cylindrical portion of the holder. The collar is also in screw threaded engagement with an axially movable but non-rotatable nut secured to the collet for moving axially therewith. Upon rotation of the collar, the non-rotatable nut and attached collet are positively moved axially to and from the aforesaid clamping engagement with the tool shank.

Limited lost motion between the collet and the actuating nut is provided by the attachment therebetween so that as the nut is moved axially to move the collet into clamping engagement with the tool shank, the collet is free to align itself precisely with a mating coaxial conical surface of the tool holder regardless of slight deviations of the nut from coaxial alignment with the collet, as might result by reason of lax tolerances in the screw threaded engagement between the collar and the nut. Thus, without recourse to precise machining of the nut and its threaded engagement with the collar, the desired high precision coaxial support for the tool is assured to enable high speed high precision machining.

Other objects are to provide the nut, that may be detachably secured to the collet, with diametrically spaced axially extending notches that ride axially along non-rotatable prongs or retaining projections of the tool holder to prevent rotation of the nut with the collar. Thus upon rotation of the collar, the screw threaded engagement between the collar and nut immediately moves the non-rotatable nut and attached collet axially to and from clamping engagement with the tool shank, depending upon the direction of rotation of the collar, whereby rotational slipping of the collet within its mating conical recess within the tool holder is avoided; and to provide the collar and nut with interengaging screw threads such that rotation of the collar to move the collet into clamping engagement with the tool shank will be opposite the normal direction of rotation of the tool in the cutting operation, whereby the cutting operation tends to enhance the gripping action of the collet.

Another object is to provide improved means for enabling rotation of the collar on the cylindrical surface of the tool holder while preventing axial movement, comprising a radially resilient retention ring secured within confronting anular grooves in the collar and cylindrical surface upon which the collar is rotatable. The axially spaced sides of the ring and its retaining grooves comprise parallel planes normal to the axis of the tool holder and shank, whereby axial force transmitted between the ring the side walls of the groove is distributed uniformly around the entire circumference of the ring, minimizing wear between the parts and enabling close confinement of the ring between the side walls of the grooves.

Another object is to provide the collar with annularly arranged beveled gear teeth engageable with mating beveled gear teeth of a wrench rotatable about an axis normal to the axis of the holder, whereby the wrench is insertable through a comparatively small radially opening window in the bushing adapter to enable rotation of the collar and clamping and releasing of the cutting tool.

Other objects of this invention will appear in the following description and appended claims, reference being had to the accompanying drawings forming a part of this specification wherein like reference characters designate corresponding parts in the several views.

THE PRIOR ART

The following patents cited during the prosecution of my above mentioned copending application are representative of the state of the art:

U.S. Pat No.: 2,709,600 Lehde
U.S. Pat. No. 2,717,791: Packer
128,003: Hebert et al (United Kingdom)
U.S. Pat. No. 102,404: Johansson (Sweden)

Although the above noted patents are not concerned with quick-change tool holders for gun drills or reamers, they are of general interest in representing the state of the art.

Lehde illustrates the use of an annular set of balls 20 for enabling rotational but not axial movement of a nut 16 on an adapter 7. Turning of the nut 16 moves the collet 18 into or out of the conical adapter recess. Regardless whether or not the ball-nut mechanism is suitable for the intended use described by Lehde, the patent is not in any way concerned with the combination of a collar rotatably mounted on the spindle body of a tool holder for a gun drill, wherein the collet is prevented from rotation by sliding engagement with tool holder prongs extending through notches in a nut loosely secured to the collet, and wherein the collar is provided with a beveled gear rotatable by means of a Jacobs typs wrench, enabling quick-change of a tool in situations wherein the collar is otherwise not readily accessible, as for example when used with a gun drill tool that must be rotatably supported fore and aft of the collar.

Packer illustrates the use of a radially expandable and contractable resilient ring 33, but is otherwise utterly unconcerned with the invention described herein.

The two foreign patents illustrate rotatable but non-axial movable mechanisms for moving a tool into and out of engagement with its driving means, but like Lehde are in no manner concerned with the provision for facilitating tool changing in the environment of a tool holder for a gun drill or reamer.

IN THE DRAWINGS

Figure 1:
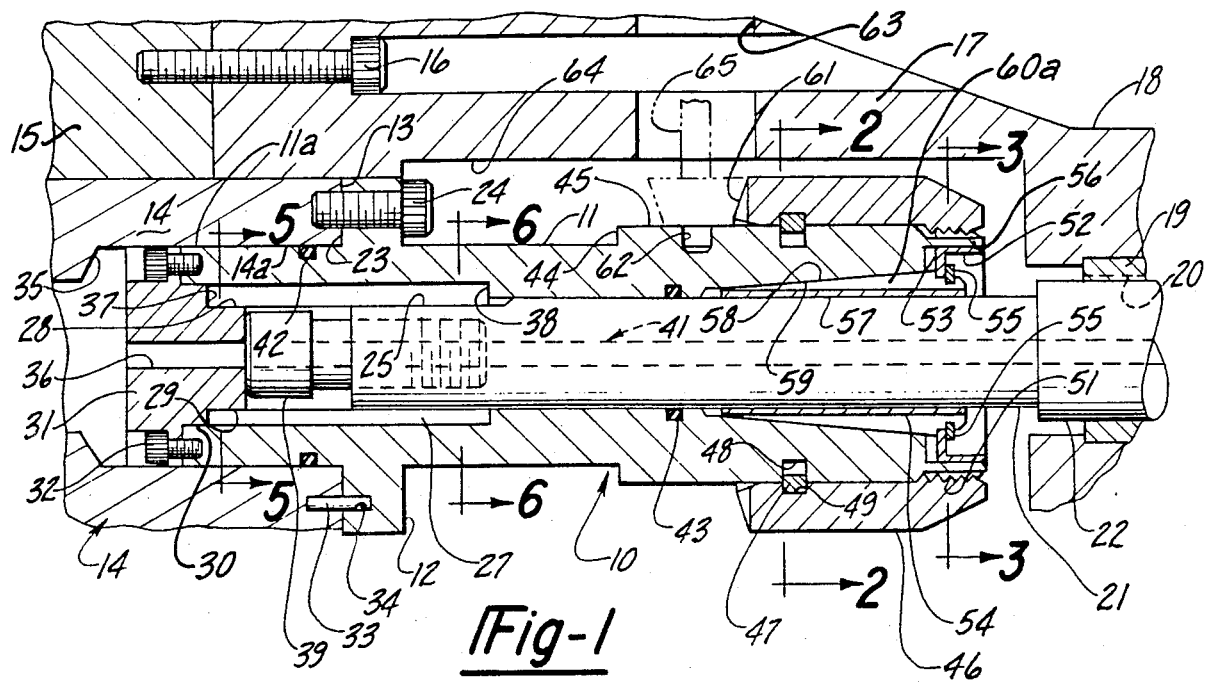
FIG. 1 is a fragmentary longitudinal mid sectional view through a gun drill or reamer apparatus incorporating a tool holder embodying the present invention.
Figure 2:
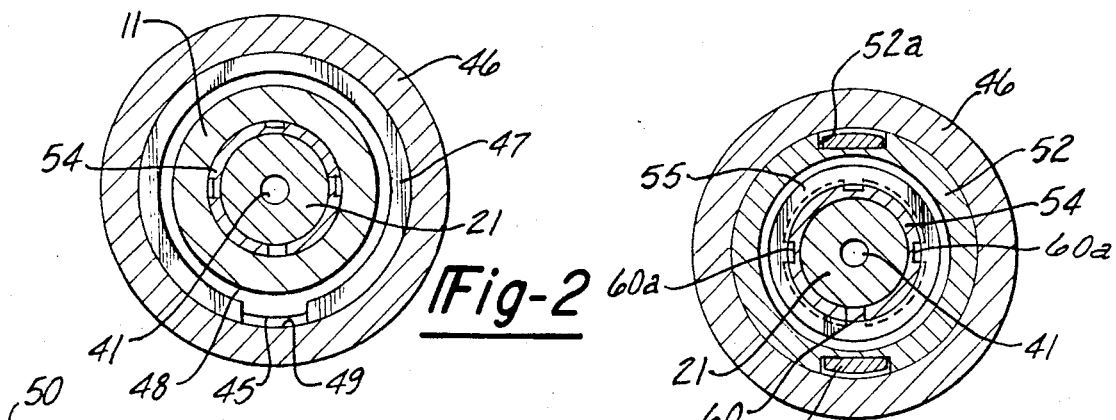
FIG. 2 is a transverse sectional view illustrating the holder body and collar assembled together, taken in the direction of the arrows essentially along the line 2—2 of FIG. 2, the collet being rotated 45° from the FIG. 1 position to show a detail of construction.
Figure 2:
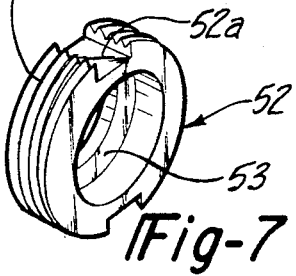
Figure 5:
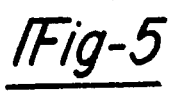
Figure 4:
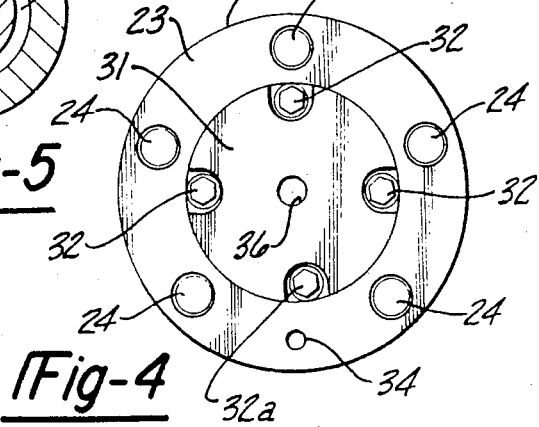
FIG. 4 is an end view of the tool holder removed from the power driving means, taken from the left end of FIG. 1.
Figure 6:
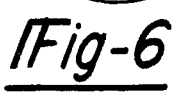

FIGS. 5 and 6 are transverse sectional views taken in the direction of the arrows substantially along the lines 5—5 and 6—6 respectively of FIG. 1.

Figure 7:
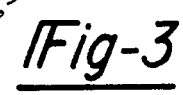
Figure 7:
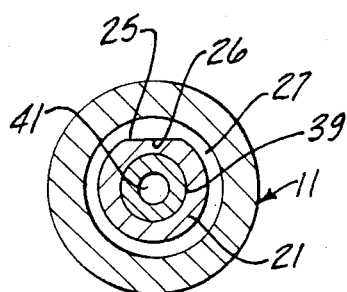

FIG. 7 is an isomeric view of the collet actuating nut.

DESCRIPTION OF THE INVENTION

Referring to the drawings, a rotatable and axially movable tool holder 10 comprises an outer spindle or body 11 of annular section having an annularly enlarged locating or pilot flange 12 adapted to be removably secured coaxially to an annular end surface 13 of a rotatable and axially movable power driven tubular quill 14. The quill 14 is indexed angularly with respect to and keyed by conventional means not shown to an outer spindle 15 for rotating as a unit therewith, but is free to move axially relative to the outer spindle 15.

The outer spindle 15 in turn is secured by a plurality of bolts 16 to a bushing adapter 17 of generally annular section that encloses the holder 10 and the forward or right end of the quill 14. One of the bolts 16 is dimensioned differently from the others to assure an attachment of the adapter 17 to the spindle 15 at only one predetermined rotational position with respect thereto.

The right or forward end of the adapter 17 is reduced in diameter at 18 to provide a holder for an annular carbide bushing 19. The latter is suitably secured conventionally within the inner cylindrical surface of the portion 18 at a predetermined angular position and is provided with an axially extending groove 20 opening radially inwardly for axial passage of a diamond cutting tip (not shown) that may be carried conventionally adjacent to the outer end of a tool 21. In the present instance, the tool 21 is provided with an annular enlargement 22 having a precision ground cylindrical outer surface mating and closely confined within a mating precision ground inner cylindrical surface of the bushing 19 for securely confining a forward portion of the tool 21 coaxially with the adapter 17, quill 14, and holder 10. The end surface 13 of the quill 14 is precision ground to Provide a smooth pilot surface normal to the axis of the holder 10 and parallel to the confronting surface 23 of flange 12, which is similarly precision ground to provide a pilot surface mating with the surface 13. In addition, the outer cylindrical surface 11a at the left end of body 11 and the surrounding inner cylindrical surface 14a of the quill 4 are also precisely ground to provide closely fitting pilot surfaces. Thus when the surfaces 13 and 23 are clamped together by the bolts 24, the left end of holder 10 will also be securely maintained coaxially with the quill 4. A spline flat 25 on the left or shank end of the tool 21 is precision milled to mate with an internal flat surface 26 of an otherwise annular sleeve 27 retained coaxially within the body 11, FIGS. 5 and 6. The confronting outer and inner cylindrical surfaces of sleeve 27 and body 11 are also precisely ground to assure a close coaxial interfit therebetween. The flat 26 mates precisely with a flat surface 28 of an otherwise coaxial cylindrical locating portion 29 of an endcap 31. The portion 29 has an outer diameter closely interfitting within the inner cylindrical surface of sleeve 27 with the flat 28 flush with the flat 25.

Figure 3:
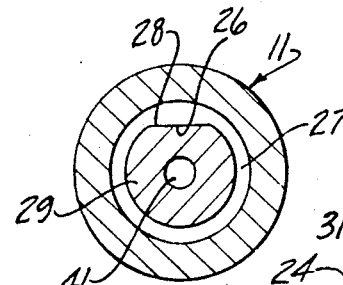
FIG. 3 is a transverse sectional view taken in the direction of the arrows essentially along the line 3—3 of FIG. 1, illustrating the collet actuating assembly, wherein the collet is located as illustrated in FIG. 2.

Cap 31 has a precisely ground cylindrical pilot extension 30 that closely interfits coaxially with the precisely ground inner cylindrical surface of body 11 to assure accurate coplanar alignment of the flat surfaces 25, 26, and 28. Rearwardly of the pilot extension 30, the cylindrical cap 31 is slightly reduced in diameter with respect to the butt or left end of body 11 and is secured thereto by a plurality of Allen set screws 32 recessed into the cap 31. As indicated in FIG. 3, the uppermost and the two lateral screws 32 are arranged on the vertical and horizontal mid-planes of the body 11, whereas the bottom screw 32a is slightly offset from the vertical mid-plane to permit attachment of the cap 31 to the body 11 in only one rotational position whereat the flat 28 is uppermost and horizontal, FIGS. 5 and 6.

The quill 14 is fitted with a dowel 33 that fits snugly within a mating dowel hole 34 located on the vertical mid-plane and extending into the surface 23 of pilot flange 12 to which the quill 14 is bolted. All of the mating or closely fitting surfaces described herein are machined to close tolerances to assure the desired coaxial relationships between the holder 10 and tool 21.

The central bore 35 of the quill 14 comprises a conduit for cooling and lubricating fluid from a conventional source, not shown, and communicates with a coaxial bore 36 through the endcap 31. The latter is also provided with a shoulder 37 that extends radially from the left end of locating portion 29, FIG. 1, and cooperates with an annular radially inwardly directed internal shoulder 38 of the body 11 to confine the sleeve 27 against axial movement.

In accordance with conventional practice, a locating bolt 39 is adjustably screwed coaxially into the left or butt end of the shank of tool 21 for abutting the right end of the locating portion 29, thereby to adjust the axial position of the tool 21. The coolant bore 36 communicates with a similar coolant duct 41 that extends coaxially through the locating bolt 39 and tool 21 to the latter's external cutting end, not shown.

Fluid leakage between the inner cylinder surface of the quill 14 and outer cylindrical surface of the body 11 is prevented by an O-ring seal 42 partially recessed into an annular groove therefor in the outer surface of body 11. Forwardly or rightward of the shoulder 38, the inner diameter of the body 11 provides a slightly circumferential clearance (too small to be detected in the drawing) from the outer diameter of tool 21. Leakage of fluid therebetween is prevented by an annular seal 43, similar to seal 42, recessed partially into the inner circumference of body 11.

The forward end of the body 11 enlarges radially at 44 to provide a cylindrical outer bearing surface 45 for a closely fitting annular sleeve 46 which is freely rotatable on the surface 45 but is restrained against axial movement by means of a resilient radially deformable ring 47, as for example, a C-ring confined within confronting annular grooves 48 and 49 within the outer circumference of surface 45 and the inner circumference of sleeve 46, respectively. The forward and rearward annular edges of the ring 47 lie in parallel planes normal o the tool axis and are closely confined between parallel juxtaposed edges of the grooves 48 and 49 to minimize axial lost motion of the sleeve 46 with respect to the body 11.

The forward end of sleeve 46 is internally threaded at 51 to mate with an externally threaded portion 50 of an annular collet actuating nut 52, FIG. 7. The left or rearward end of the nut 52 comprises a unitary radially inwardly extending annular flange 53 having an inner periphery coaxial with the body 11 and seating freely on a mating reduced diameter cylindrical forward end surface of a tapered split collet 54, FIG. 1. The flange 53 is confined between a shoulder, defining the leftward extent of the reduced diameter cylindrical surface of collet 54 on which flange 53 is seated, and a resilient retaining ring 55. The latter is seated within a radially outwardly opening annular retaining groove in the aforesaid reduced diameter of cylindrical end surface of collet 54, which groove is located immediately forward of the flange 53, whereby the assembled nut 52 and collet 54 are held together as a unit.

The nut 52 is prevented from rotation relative to body 11 by means of a pair of diametrically opposed prongs 56 integral with the body 11 and extending axially forward and slidably through closely fitting mating notches 52a opening radially outwardly and extending axially through the threaded portion 50 of nut 52, FIGS. 1 and 3. The collet 54 provides a cylindrical inner surface 57 dimensioned to conform closely to the outer surface of the tool 21 when clamped thereto as described below. The outer surface of the collet 54 comprises a rearwardly converging conical locking cam surface 58 mating with an internal forwardly enlarging conical cam surface 59 of the holder 11 that opens coaxially at its forward end to permit insertion and withdrawal of the collet 54. The mating conical surfaces 58 and 59 are precisely ground to a predetermined conical locking angle, say approximately 10 degrees, to effect a coaxial clamping action on the tool 21 throughout the axial length of the inner cylindrical surface 57 of the collet 54 upon its leftward movement with respect to the holder body 11. The clamping action of the collet 54 is enabled by means of a conventional split 60, extending axially for the length of the collet 54, and three axially extending uniformly spaced channels 60a opening outwardly from the outer surface 58 of the collet 54 to enhance its flexibility and gripping action, FIG. 3.

Upon rotation of the collar 46 in a lefthand direction, i.e., counterclockwise looking from left to right in FIG. 1, its threaded connection at 51 with the external threads 50 of the non-rotatable nut 52 will move the latter and collet 54 leftward into clamping engagement with the tool 21 to hold the same in coaxial alignment with the holder 10. Upon a reverse turning of the collar 46, the collet 54 will be pulled rightward from its clamping engagement with the tool 21, enabling the latter to be slid axially from the holder 10 for replacement by another tool.

By reason of the annular nut flange 53 seated freely on the reduced diameter forward cylindrical surface of the collet 54 and confined thereon by the radially resilient ring 55, slight cocking of the collet axis with respect to the nut axis is permitted. Thus the necessity and expense of precisely machining the nut 52 and threads 50 so as to be coaxial with both the collet 54 and internal threads 51 of the sleeve 46 are avoided, as would otherwise be required if the nut 52 and collet 54 were formed as a one-piece unitary part. The construction described enables the mating conical surfaces 58 and 59 of the collet 54 and body 11 to seat coaxially with each other, thereby to clamp the tool 21 coaxially with superior accuracy at an appreciable reduction in cost, i.e., a guaranteed accuracy of 0.000050 T.I.R. (Total Indicator Reading) one inch from the front end of the collet 54, meaning that at a location one inch forward of the collet 54, the total deviation of the tool axis from the axis of the spindle 14 during a 360° rotation will not exceed fifty millionths of an inch.

Rotation of the collar 46 is enabled by a Jacobs type beveled tooth gear 61 formed integrally and coaxially with the left end of collar 46. Several tool seating sockets 62 are formed in and uniformly spaced circumferentially around the outer cylindrical surface 45 for reception of an end portion of a conventional Jacobs type beveled gear tool or wrench 65 shown in phantom, FIG. 1, which when seated within one of the sockets 62, enables its teeth to mesh with the teeth 61 and rotate the collar 46 around the surface 45 upon rotation of the Jacobs tool about an axis normal to the axis of the holder 10. Radially opening access windows 63 are provided in the adaptor 15 for passage of the Jacobs tool into simultaneous engagement with one of the sockets 62 and teeth 61.

The resilient rings 47 and 55 may be similar to each other and the ring 55 within its retaining groove may be similar to the ring 47 and groove 48 in all respects, except that the ring 55 may seat closely to the base of its retaining groove, whereas the ring 47 cannot seat against the base of its retaining groove 48, as explained below. Likewise, both rings 47 or 55 are resilient and expandable circumferentially to enable their assembly within their respective retaining grooves, and may comprise conventional C-rings or multiple spiral rings, for example.

Assembly of the ring 47 prior to assembly of the collar 46 on the surface 45 is accomplished by expanding the circumference of the resilient ring 47 until it can be slid rearwardly over the forward end of surface 45. The expanded ring 47 is then slid rearwardly until it snaps resiliently into the groove 48. Ring 47 is then compressed radially into groove 48 until the outer circumference of ring 47 is flush with the outer surface 45. The collar 46 is then slid leftward over the forward end of surface 45 until the ring 47 snaps resiliently outwardly into groove 49. The inner circumference of ring 47 will remain within groove 48.

In regard to ring 55, the nut 52 is first sleeved on the aforesaid reduced diameter cylindrical end of collet 54 to the shoulder defining the leftward extent of the latter cylindrical end, whereat flange 53 is leftward of the groove for the ring 55. The latter is then expanded radially to fit over the forward reduced end of collet 54 and moved leftward until the ring 55 snaps resiliently into its retaining groove in the collet 54, with its outer periphery extending radially outwardly beyond the inner periphery of flange 53 to hold the collet 54 and nut 52 assembled together as a unit.

In operation of the tool holder 10 and assembly described, the quill 14 and outer spindle 15 (with the attached bushing adaptor 17) are power rotated as a unit by conventional means, whereby the holder 11, secured to the quill 14 by the bolts 24, and the tool 21 splined to the holder 11 by the chordal flats 25, 26, 28, are also rotated to enable a conventional cutting operation. By virtue of the pilot surfaces 13 and 23 and the coaxial confinement of the tool 21 at both the rearward and forward ends of the body 11, i.e., by the sleeve 27 and collet 54, effective axial alignment of the tool 21 and its cutting end (not shown), is maintained during a cutting operation.

The positive spline drive of the tool 21 effected by the spline flats 25, 26, and 28 assumes the driving force required to rotate the tool 21 during a cutting operating, thereby to relieve the collet of such driving stress. The collet is thus required only to maintain the tool 21 in coaxial alignment with the holder 10. In consequence, the clamping action of the collet 54 against the tool 21 may be appreciably less than would otherwise be required if the collet 54 were relied upon to provide the driving force between the tool holder 10 and the tool 21 during a cutting operation. Furthermore, the collet 54 cannot slip rotationally around the clamped tool 21 during a high torque cutting operation. Destructive wear therebetween is thus minimized. During a cutting operation, the quill 14 and attached holder 11 are also moved axially relative to the adaptor 17 by conventional means not shown. To this end, an internal enlarged diameter portion 64 of the adaptor 17 enables such axial movement of the radially enlarged collar 46.

By means of the one-position-only rotational attachments between the quill 14, outer spindle 15, adapter 17, and body 11, effected by the dowel 33, the offset screw 32a, the coplanar chordal flats 25, 26 and 28, and the above mentioned non-uniform diameters of the bolts 16, the above mentioned diamond cutting tip of the tool 21 will always be aligned with the groove 20 in the carbide bushing 19, so as to move axially along the latter during the cutting operations without being damaged by engagement with the bushing 19.

When the cutting tool becomes worn, or for any other reason, it may be quickly released from the holder 10 and replaced merely by inserting the Jacobs type tool 65 through window 63 into engagement with socket 62 and gear 61 and rotating the tool 65, phantom view, FIG. 1. When the collar 46 is rotated clockwise, (looking from left to right) the threaded engagement 51, 50 between the non-axially movable collar 46 and non-rotatable collet actuating nut 52 will move the collet 54 outward to release it from the tool 21. Also, because the comparatively light clamping force between the collet 54 and cutting tool 21 enabled by the present invention is not required to provide the driving force for the tool 21 during a cutting operation, jamming of the collet 54 against the tool 21 during the clamping action is avoided and only nominal force is required to move the collet 46 rightward to release its clamping engagement with the tool. Counterclockwise rotation of the collar 46 to tighten the clamping action between the collet 54 and tool 21 is preferred because the usual clockwise rotation of the tool 21 during a cutting operation will tend to enhance the collet clamping action. Of course, where rotation of the tool in a cutting operating is reversed, a collar 46 having an oppositely arranged or righthand threaded connection with the collet clamping nut 52 will be preferred.

I claim:

1. In a power driven tool holder for gun drills and reamers, the combination of a spindle body having a passage extending coaxially therethrough, said body having coaxial precisely dimensioned inner and outer cylindrical surfaces adjacent to a rearward end, said outer cylindrical surface defining a pilot for interfitting coaxially in piloted relationship with a mating internal cylindrical surface of power driven means, a sleeve having a precisely dimensioned external cylindrical surface closely interfitting in piloted relationship within said inner cylindrical surface of said spindle body and also having a precisely dimensioned coaxial inner cylindrical surface, an end piece having a precisely dimensioned external cylindrical surface closely interfitting in piloted relationship within a rearward portion of said inner cylindrical surface of said sleeve, each of the latter two cylindrical surfaces having a precisely dimensioned chordal flat surface closely confronting the chordal flat surface of the other cylindrical surface and maintaining said latter two cylindrical surfaces in fixed rotational alignment with respect to each other, the chordal flat of said sleeve extending forwardly from the chordal flat of said end piece for the entire length of said sleeve to provide a spline for interfitting in driving engagement with a mating spline flat of a tool shank confined coaxially within said spindle body, means for securing said end piece and spindle body together in only one rotational position of alignment with respect to each other, and clamping means at the forward end of said spindle body cooperable with said sleeve and pilot surfaces for holding the shank of a tool coaxially within said passage.

2. The combination according to claim 1, said spindle body having an annular flange extending radially outwardly from the outer cylindrical pilot surface of said body, said flange having a precisely dimensioned plane annular pilot surface normal to the axis of said body and facing rearwardly for abutting in piloted relationship a mating parallel surface of said power driven means, and screw threaded means for securing said flange to said power driven means.

3. The combination according to claim 2, means on said flange for interfitting with said power driven means in only one position of rotational alignment, said end piece having a precisely dimensioned external cylindrical surface closely interfitting in piloted relationship within a rearward portion of said inner cylindrical surface of said spindle body and terminating forwardly in a radial inward step located rearwardly of said external cylindrical surface of said end piece that interfits within said inner cylindrical surface of said sleeve, said inner cylindrical surface of said body terminating forwardly in a radial inward annular step, and said sleeve being confined between said steps against axial movement within said spindle body.

4. The combination according to claim 2, said clamping means comprising a coaxial conical collet receiving portion of said passage enlarging and opening forwardly, a radially contractable tool holding collet having an inner cylindrical tool clamping surface for releaseably holding a tool shank coaxially with the axis of said holder and also having an outer rearwardly converging conical surface mating coaxially with said conical collet receiving portion of said passage for contracting said collet radially in a tool clamping action upon axial inward movement of said collet to a clamping position within said collet receiving portion of said passage, a screw threaded collet actuating nut, means operatively connecting said nut and collet for moving axially simultaneously and for enabling limited movement of said nut out of coaxial alignment with respect to said collet, means for enabling axial movement while preventing rotational movement of said nut with respect to said body, a collar rotatable on said body, means for enabling rotational movement while preventing axial movement of said collar with respect to said body, said collar having a threaded portion in screw threaded engagement with the screw threads of said nut for moving the latter and collet axially of said body to and from said clamping position upon rotation of said collar in one direction or the opposite on said body.

5. The combination according to claim 4, means on said flange for interfitting with said power driven means in only one position of rotational alignment, said end piece having a precisely dimensioned external cylindrical surface closely interfitting in piloted relationship within a rearward portion of said inner cylindrical surface of said spindle body and terminating forwardly in a radial inward step located rearwardly of said external cylindrical surface of said end piece that interfits within said inner cylindrical surface of said sleeve, said inner cylindrical surface of said body terminating forwardly in a radial inward annular step, and said sleeve being confined between said steps against axial movement within said spindle body.

6. A combination according to claim 4, said collet having a coaxial outer cylindrical surface at its forward end and terminating rearwardly in a radially outwardly extending riser, said nut having an externally threaded outer cylindrical portion in said screw threaded engagement with said screw threaded portion of said collar and also having an annular flange extending radially inwardly from said externally threaded outer cylindrical portion, said annular flange having an inner circumference seated on said cylindrical outer surface of said collet with sufficient clearance to enable limited cocking out of coaxial alignment with said collet, and means on said collet for holding said flange of said nut on said outer cylindrical surface of said collet and adjacent to said riser.

7. The combination according to claim 6, said means on said collet for holding said flange comprising a radially resilient retaining ring having inner circumferential portions seated within a retaining groove therefor in said collet immediately forward of said flange and having outer circumferential portions radially overlapping inner circumferential portions of said flange immediately forward thereof.

8. The combination according to claim 7, means on said flange for interfitting with said power driven means in only one position of rotational alignment, said end piece having a precisely dimensioned external cylindrical surface closely interfitting in piloted relationship within a rearward portion of said inner cylindrical surface of said spindle body and terminating forwardly in a radial inward step located rearwardly of said external cylindrical surface of said end piece that interfits within said inner cylindrical surface of said sleeve, said inner cylindrical surface of said body terminating forwardly in a radial inward annular step, and said sleeve being confined between said steps against axial movement within said spindle body.

9. The combination according to claim 5, said collar having gear teeth arranged annularly around the axis of said body, and a radially outwardly opening socket in said body adjacent to said teeth for reception of a radially extending guide for a toothed wrench having gear teeth engageable with the gear teeth of said collar for rotating the latter around the axis of said body.

10. The combination according to claim 9, said means for preventing axial movement of said collar comprising a radially resilient retention ring having outer and inner peripheral portions closely confined within confronting grooves in said collar and body.

11. The combination according to claim 4, said means for preventing axial movement of said collar comprising a radially resilient retention ring having outer and inner peripheral portions closely confined within confronting grooves in said collar and body.

12. The combination according to claim 11, said collar comprising a one piece annular collar, and said retention ring prior to assembly within said confronting grooves being resiliently deformable radially for extending around the cylindrical surface of said body on which said collar is rotatable and also for confinement entirely within the groove in said body to enable said assembly.

13. In a power driven tool holder for gun drills and reamers, the combination of a spindle body having a passage extending coaxially therethrough, pilot means adjacent to a rearward end of said body for coaxial attachment in piloted relationship with power driven means and for effecting a coaxial driving engagement with the shank of a cutting tool, means at the forward end of said body for releasably clamping a tool shank comprising a coaxial conical collet receiving portion of said passage enlarging and opening forwardly, a radially contractable holding collet having an inner cylindrical tool clamping surface for releasably holding a tool shank coaxially with the axis of said holder and also having an outer rearwardly converging conical surface mating coaxially with said conical collet receiving portion of said passage for contracting said collet radially in a tool clamping action upon axial inward movement of said collet to a clamping position within said collet receiving portion of said passage, a screw threaded collet actuating nut, means operatively connecting said nut and collet for moving axially simultaneously and for enabling limited movement of said nut out of coaxial alignment with respect to said collet, means for enabling axial movement while preventing rotational movement of said nut with respect to said body, a collar rotatable on said body, means for enabling rotational movement while preventing axial movement of said collar with respect to said body, said collar having a threaded portion in screw threaded engagement with the screw threads of said nut for moving the latter and collet axially of said body to and from said clamping position upon rotation of said collar in one direction or the opposite on said body.

14. The combination according to claim 13, said collet having a coaxial outer cylindrical surface at its forward end and terminating rearwardly in a radially outwardly extending riser, said nut having an externally threaded outer cylindrical portion in said screw threaded engagement with said screw threaded portion of said collar and also having an annular flange extending radially inwardly from said externally threaded outer cylindrical portion, said annular flange having an inner circumference seating on said cylindrical outer surface of said collet with sufficient clearance to enable limited cocking out of coaxial alignment with said collet, and means on said collet for holding said flange of said nut on said outer cylindrical surface of said collet adjacent to said riser.

15. The combination according to claim 14, said means on said collet for holding said flange comprising a radially resilient retaining ring having inner circumferential portions seated within a retaining groove therefor in said collet immediately forward of said flange and having outer circumferential portions radially overlapping inner circumferential portions of said flange immediately forward thereof.

16. The combination according to claim 15, said collar having gear teeth arranged annularly around the axis of said body, and a radially outwardly opening socket in said collar adjacent to said teeth for reception of a radially extending guide for a toothed wrench having gear teeth engageable with the gear teeth of said collar for rotating the latter around the axis of said body.

17. The combination according to claim 16, said means for preventing axial movement of said collar comprising a radially resilient retention ring having outer and inner peripheral portions closely confined within confronting grooves in said collar and body.

18. The combination according to claim 17, said collar comprising a one-piece annular collar, and said retention ring prior to assembly within said confronting grooves being resiliently deformable radially for extending around the cylindrical surface of said body on which said collar is rotatable and also for confinement entirely within the groove in said body to enable said assembly.

19. The combination according to claim 13, said collar having gear teeth arranged annularly around the axis of said body, and a radially outwardly opening socket in said collar adjacent to said teeth for reception of a radially extending guide for a toothed wrench having gear teeth engageable with the gear teeth of said collar for rotating the latter around the axis of said body.

20. The combination according to claim 19, said collar comprising a one-piece annular collar, said means for preventing axial movement of said collar comprising a resilient retention ring having outer and inner peripheral portions closely confined within confronting grooves in said collar and body, and said retention ring prior to assembly within said confronting grooves being resiliently deformable radially for extending around the cylindrical surface of said body on which said collar is rotatable and also for confinement entirely within the groove in said body to enable said assembly.

* * * * *